Figure 3:
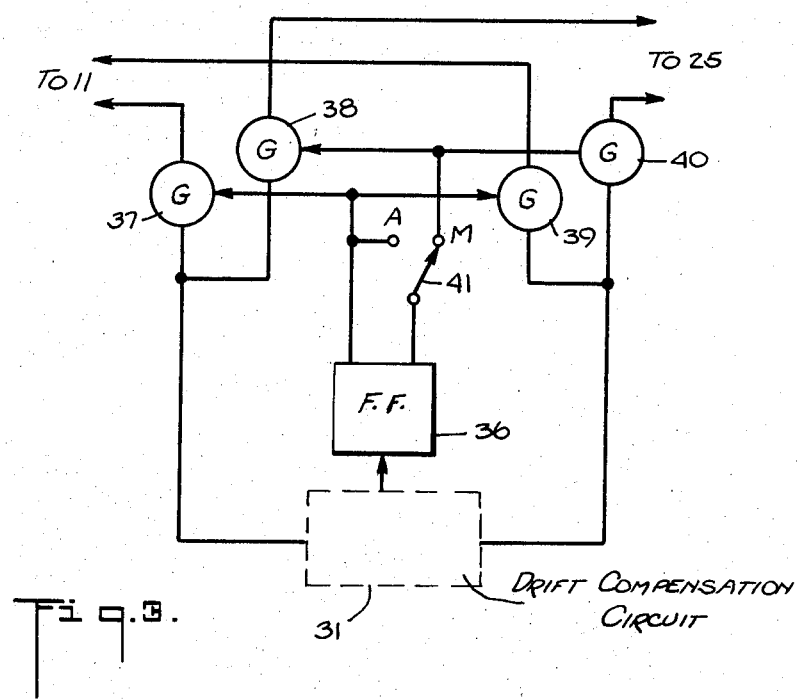

United States Patent [19]
Kobayashi

[11] 3,772,602
[45] Nov. 13, 1973

[54] PROCESS CONTROLLER WITH BUMPLESS TRANSFER

[75] Inventor: Tamotsu Kobayashi, Yokohama, Japan

[73] Assignee: Fischer & Porter Company, Warminster, Pa.

[22] Filed: Sept. 5, 1972

[21] Appl. No.: 286,065

[52] U.S. Cl. ................... 328/71, 328/127, 318/591
[51] Int. Cl. .......................................... H03k 17/02
[58] Field of Search ..................... 328/71, 127, 151; 318/591

[56] References Cited
UNITED STATES PATENTS

| 3,654,560 | 4/1972 | Cath et al. | 328/127 |
| 3,662,275 | 5/1972 | Riley | 328/71 X |
| 3,662,276 | 5/1972 | Hyer | 328/71 X |
| 3,667,055 | 5/1972 | Uchida | 328/127 |

*Primary Examiner*—John S. Heyman
*Attorney*—Michael Ebert

[57] ABSTRACT

A process controller operable in the automatic or manual mode without producing a bump as a result of setpoint transfer or automatic-to-manual transfer. The setpoint and manual control stations may be constituted by an operational amplifier and a holding capacitor. Output drift of these stations due to leakage is suppressed effectively by a single drift compensation circuit whose output is applied to these stations selectively or alternately on a time-sharing basis.

1 Claim, 4 Drawing Figures

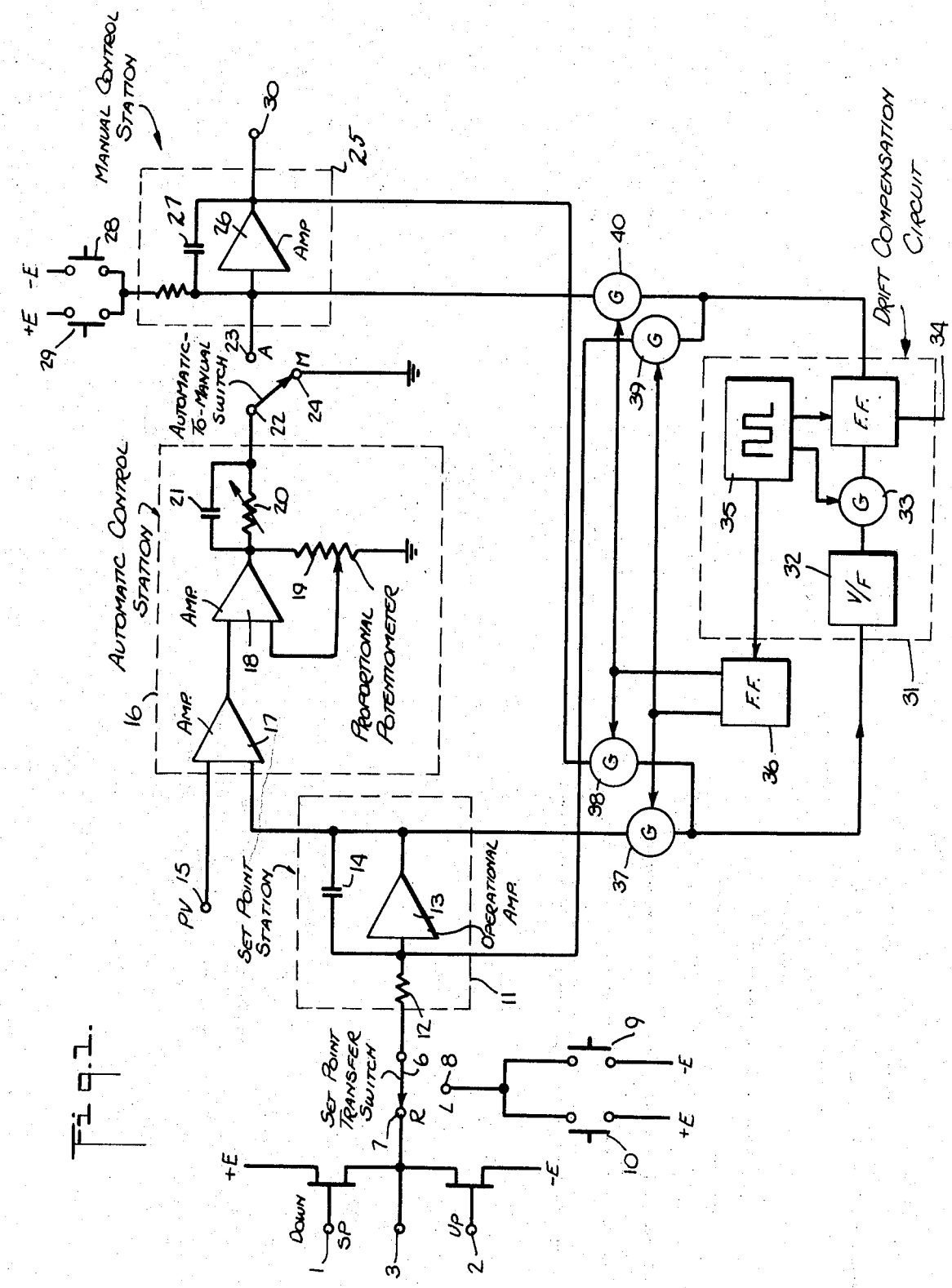

PROCESS CONTROLLER WITH BUMPLESS TRANSFER

BACKGROUND OF INVENTION

This invention relates generally to process controllers, and more particularly to an electronic circuit adapted to compensate on a time-sharing basis for the drifts encountered in the manual control and setpoint stations of a process controller.

In process controller arrangements, it has heretofore been the usual practice to provide a manual control station having an operational amplifier in combination with a hold capacitor in order to minimize an output bump due to a control mode transfer between automatic and manual.

However, with an electronic holding circuit of this type, the current has a tendency to drift because of leakage. That is to say, the charge stored in the hold capacitor will decay through the leakage resistance of the capacitor as well as the relatively low input impedance of the amplifier. As a consequence, the output will change with respect to time and a smooth transfer will not be effected.

In a conventional process controller there is provided a setpoint station, a potentiometer or like device being employed to generate a setpoint voltage signal. In case of cascade control or setpoint supervision by a computer, the controller may be responsive to a remote setpoint signal besides the local setpoint signal supplied by the potentiometer. In such a controller, a transfer of setpoint between remote and local setpoint modes will give rise to a setpoint bump and hence a controller output bump, unless some sort of servo tracking system is included to prevent an abrupt transition in setpoint values.

To eliminate such bumps, it is the practice to incorporate an analog hold circuit in the setpoint station, operating in the same manner as in the manual control station. The setpoint station should, for this purpose, have integral hold characteristics in both the local and remote modes or at least in the local mode. But here too, as in the case of the manual control station, the setpoint station is subject to drift because of leakages.

Thus, even though the setpoint and manual control stations are provided with circuits having integral hold characteristics, a smooth transition is not effected in mode transfer because of leakages which produce a disparity between the values before and after transfer.

SUMMARY OF INVENTION

In view of the foregoing it is the main object of this invention to provide a single drift compensation circuit operating on a time-sharing basis to compensate for drift in the manual control station and in the setpoint station, both stations having integral hold characteristics.

Because of the fact that the drift compensation operates with the setpoint and manual control stations, both of which use a simple, low-cost hold circuit, bumpless mode transfer is effected despite leakages that otherwise would give rise to bumps.

Briefly stated, this object is attained in a drift compensation circuit in which the output of the integral hold circuit of the manual control station or of the setpoint station is converted to digital signals having adequate resolution. Depending on variations in the last digit of the digital signals, a compensating signal is periodically applied to the input side of the hold circuit amplifier to correct for output drift.

OUTLINE OF THE DRAWING

Figure 4:
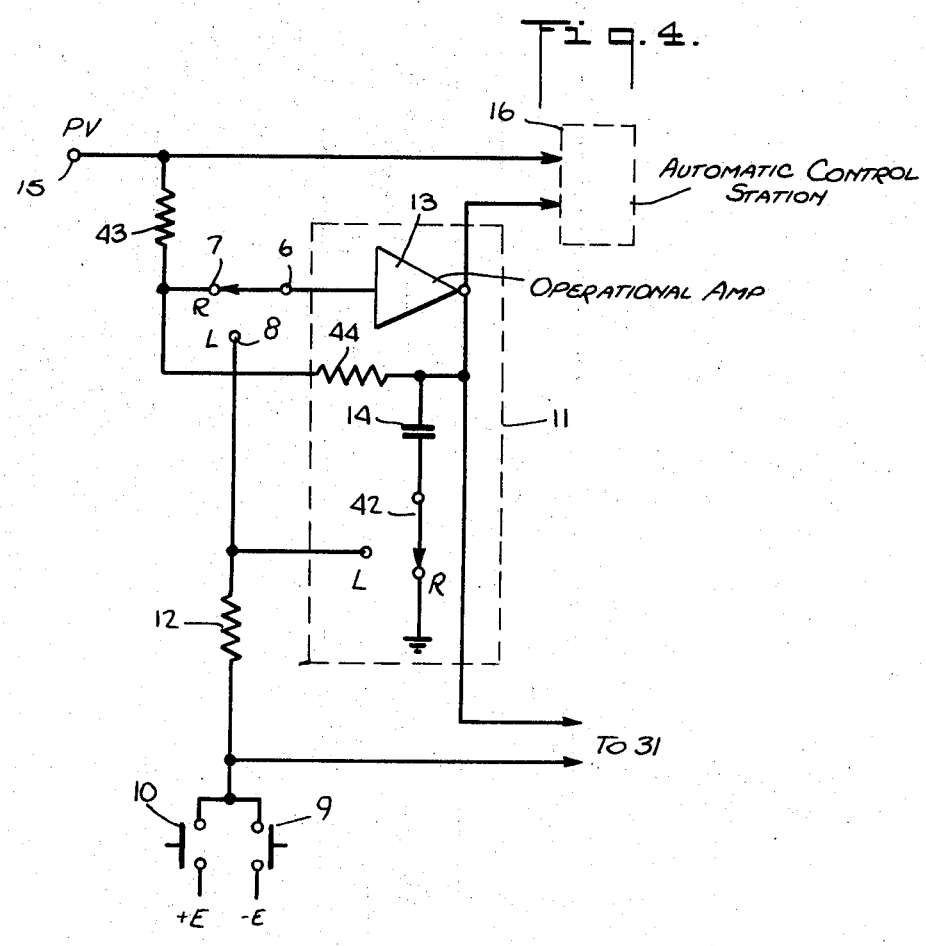
Figure 2:
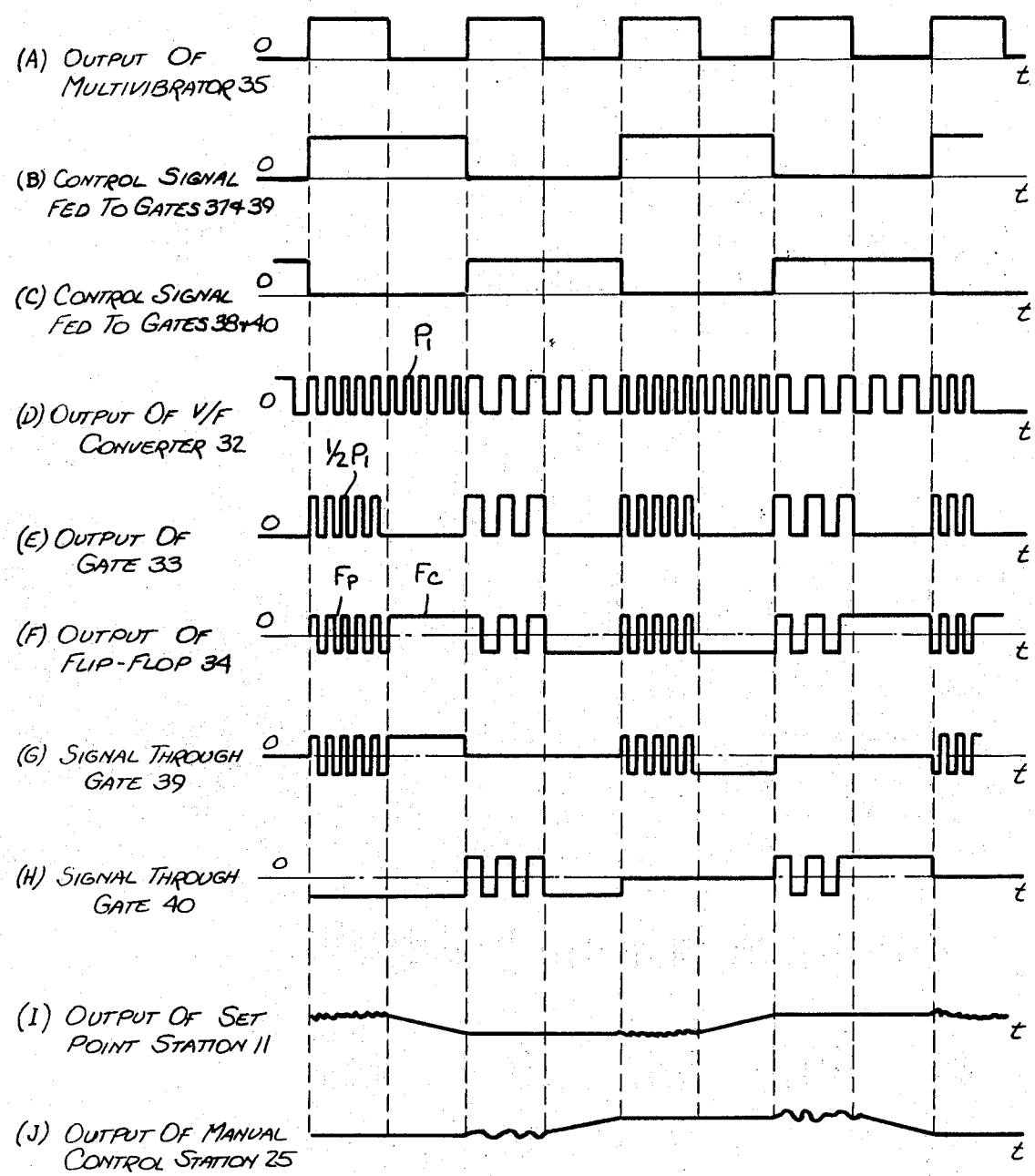

For a better understanding of the invention as well as other objects and further features thereof, reference is made to the following detailed description to be read in conjunction with the accompanying drawing, wherein:

FIG. 1 is the basic block diagram of a process controller having drift compensation in accordance with one preferred embodiment of the invention;

FIG. 2 graphically illustrates the operating principles underlying the invention;

FIG. 3 is a schematic diagram showing one modified form of drift compensation circuit; and FIG. 4 is a schematic diagram showing another modified form of drift compensation circuit.

DESCRIPTION OF INVENTION

Referring now to FIG. 1, there is shown a process controller that receives a setpoint signal SP from a supervisory computer in so-called velocity algorithm. This updating signal is impressed either between input terminals 1 and 3 or between input terminals 2 and 3 in order to control a solid state switch 4 in the first instance and a solid state switch 5 in the second instance. When solid state switch 4 is activated, a positive voltage (+E) is applied to the controller circuit and when switch 5 is activated the voltage applied (−E) is negative.

A setpoint transfer select switch 6 is provided having a fixed contact 7 connected to the input terminal 3 so that when this contact is engaged, a remote (R) updating signal is selected. A local (L) updating signal is selected when fixed contact 8 is engaged. In the local mode, fixed contact 8 is either connected through a push-button switch 9 to a negative voltage source (−E) or through a push-button switch 10 to a positive voltage source (+E), these switches being manually operated.

The output of selector switch 6 is fed to the basic setpoint station whose components are anclosed in a dashed-line block 11. This setpoint station has an integral hold characteristic in both the remote and local modes and comprises an input resistance 12, an operational amplifier 13 and a hold capacitor 14 connected between the output and input of the amplifier.

Also provided is an automatic control station whose elements are enclosed in dashed-line block 16. A process variable signal PV is applied to the input terminal 15 of the automatic control station 16, the deviation between this value and the setpoint value SP being detected in differential amplifier 17. The resultant error signal from amplifier 17 is applied to one input of a differential amplifier 18 which in combination with a proportional potentiometer 19, carries out proportional action. The resistance element of potentiometer 19 is connected to the output of amplifier 18, the slider thereof being connected to the other input of amplifier 18.

The output of amplifier 18 is connected to an automatic-to-manual selector switch 22 through an integral time potentiometer 20 shunted by a capacitor 21 which together constitute the operational network for proportional-plus-integral (P+I) action. Selector switch 22 acts to transfer the control mode between automatic (A) and manual (M), the automatic mode being in effect when fixed contact 23 is engaged and the manual mode being in effect when fixed contact 24 is engaged.

A manual control station is provided whose elements are enclosed in dashed-line block 25. The fixed contact 23 of the mode selector switch 22 is connected to the input of an amplifier 26 whose output is connected to the input thereof through a capacitor 27 constituting an integral hold circuit in the manual mode. The output of manual control station 25 is connected to a load through output terminal 30.

When selector switch 22 engages contact 23, the output of automatic control station 16 is applied to the input of manual control station 25 whose output goes to the load; hence the manual control station, in this instance, operates in conjunction with the automatic control station. Therefore, in the strict meaning of the term, station 16 is not a self-sufficient automatic control station and the designations of both stations 16 and 25 are for convenience only in describing the invention.

In the manual mode (M), when selector switch 22 engages fixed contact 24 which is grounded, push-buttons 28 and 29 serve to update the output. Push-button 28, when activated, renders negative voltage source -E effective, whereas push-button 29, when activated, renders positive voltage source +E effective.

The circuit enclosed by dashed-line block 31 is a preferred embodiment of a drift-compensation circuit in accordance with the invention. This electronic circuit comprises a voltage-to-frequency (V/F) converter 32, a gate 33, a flip-flop 34 and an astable multivibrator 35.

The voltage signal output of setpoint station 11 is applied through a gate 37 to the V/F converter 32 which converts it to a corresponding pulse frequency signal that is counted by flip-flop 34. Flip-flop 34 delivers a positive or negative output signal. Astable multivibrator 35, which controls gate 33 interposed between the V/F converter 33 and flip-flop 34, also acts to reset the flip-flop.

A second flip-flop 36, operating in conjunction with the drift compensation circuit 31, is adapted to receive a timing signal from astable multivibrator 35 to control four gates, one of which is gate 37, the other gates being designated by numerals 38, 39 and 40.

As is well known, in a process controller of the type shown, there is no danger of an output bump when the controller is subjected to a control mode transfer from automatic to manual. Therefore, no detailed description thereof will be given in this specification. The process controller also possesses the same advantage for setpoint transfer.

When selector switch 6 is transferred to engage the local position contact 8, the input circuit of amplifier 13 in setpoint station 11 is isolated and the integral hold in the output assumes the final value just before transfer. In this state, the local setpoint mode is in effect and push-button 9 or 10 may be activated to update the setpoint value.

When selector switch 6 is transferred to engage the remote position contact 7, the setpoint value will change with a definite velocity controlled by the computer whose output is applied to terminal 3 connected to selector contact 7, this transfer being effected without any bump. Thus with a controller of this type, there is no need for a troublesome balancing procedure as is necessary with conventional controllers prior to a setpoint transfer.

However, with a process controller of the type described herein, the integral hold is subject to drift in the hold mode which, unless corrected, will give rise to a bump when transfer is effected. The drift compensation circuit 31 is adapted to compensate for drift in both integral holds in the controller.

Reference is now made to FIG. 2(A) whose wave form illustrates the square wave output of astable multivibrator 35 in the drift compensation circuit. This square wave signal serves to drive flip-flop 36 which produces a control signal as shown in wave form FIG. 2(B). This control signal operates gates 37 and 39. These gates are open when the control signal (FIG. 2(B) is positive and closed when the control signal is negative.

When gate 37 is open during the positive half period of control signal FIG. 2(B), the voltage output of setpoint station 37 is applied to the V/F converter 32 and converted to a pulse signal whose rate is proportional to the applied voltage; as shown by the high-frequency pulse train $P_1$ in FIG. 2(D). During this time interval, the pulse train $P_1$ is continuously delivered to gate 33. However, gate 33 is directly controlled by the square wave FIG. 2(A) from astable multivibrator 35 and opens only during the positive half-period thereof. Hence the output of gate 33 assumes the form ½ $P_1$ shown in FIG. 2(E) which consists of the first half of wave train $P_1$.

Flip-flop 34 counts the pulse number yielded by gate 33 and holds the last count of the first half of the $P_1$ train during the second half of the $P_1$ train. The output of flip-flop 34, as shown in FIG. 2(F), is delivered to the input of amplifier 13 of the setpoint station 11 through gate 39. In the interval $F_p$ when flip-flop 34 is counting pulses, as shown in FIG. 2(F), it has no significant compensating effect on the output (FIG. 2(I) of the hold circuit of setpoint station 11, but in the succeeding interval $F_c$, when the compensating action is continuous, it has a perceptible effect. By proper selection of the circuit parameters, one is able to stabilize the output of the integral hold circuit in setpoint station 11 within a minute variation range equivalent to one cycle of the frequency output of the V/F converter 32.

These operating principles are also applicable to the manual contact station 25 which is compensated for in the same manner as the setpoint station. As shown in FIG. 2(C), the control of gates 38 and 40 are complementary to that of gates 37 and 39. Thus when the voltage at gates 37 and 39 is positive, the voltage at gates 38 and 40 is negative and when the voltage at gates 37 and 39 is negative, that at gates 38 and 40 is positive. Gate 39 passes the amplifier output (FIG. 2(J)) of the manual control station 25 into the V/F converter 32, while at the same time gate 40 passes the drift compensation output (FIG. 2(H)) of flip-flop 34 into the input of this amplifier.

In FIG. 2(D), the number of pulses illustrated has been exaggerated to be small in number to simplify illustration, but in practice, a much larger number of pulses is produced. Also, it is assumed that the output voltage of setpoint station 11 is larger than that of manual output station 25.

Thus the invention makes use of a single drift compensation circuit to effect drift compensation of the setpoint station and of the manual control station on a time-sharing basis. This time-sharing action is effected by two pairs of gates 37 - 39 and 38 — 40, controlled by astable multivibrator 35. The compensating action is applied to the setpoint station or the manual control station alternately after each cycle of the output of multivibrator 35. Though this action is not strictly continuous, as a practical matter there is no problem and drift is effectively suppressed.

In the embodiment shown in FIG. 1, drift compensation is performed on manual control station 25 even when it is transferred into the automatic mode. If the resolution of the V/F converter is sufficiently fine, this creates no problem in the performance of the converter. In some instances, however, it may be desirable, as shown in FIG. 3, to add an automatic transfer switch 41 to the drift compensation circuit. Switch 41 is ganged to selector switch 22 so that when both switches are in the automatic mode (A), gates 38 and 40 are locked and out of service.

In the embodiment of the controller shown in FIG. 1, setpoint station 11 is an analog integral type without regard to the setpoint mode in effect. The invention is also effective with a setpoint station which assumes an integral hold form at least in the local setpoint mode. In FIG. 4, setpoint station 11 functions as a voltage repeated in the remote setpoint mode (R), charging capacitor 14 with its output. In the local setpoint mode (L), capacitor 14 is connected to the input side of amplifier 13 through switches 42 and 6, thereby constituting the integral hold circuit. Drift compensation from circuit 31 is applied in this mode.

As a digitalizing means, in lieu of the voltage-to-frequency converter 32, it is possible to use other types such as the well known dual-slope type voltage-to-pulse number converter.

In drift compensation circuit 31 in FIG. 1, astable multivibrator 35 is used as a clock pulse generator to drive flip-flop 36. Alternatively, an astable multivibrator may be used in place of flip-flop 36 and driven to oscillate in synchronization with the drift compensation circuit.

In FIG. 1, manual control stations 25 is a part of the automatic control station 16. The invention herein is also applicable to a process controller having a separate manual control station.

When direct digital control (DDC) is used, the usual practice is for the computer to deliver a velocity form of updating signal to the manual control station of the backup controller where it is converted to an analog output signal. If necessary, the manual control station can be made to assume a backup function should the computer fail.

The drift compensation system in accordance with the invention is also applicable to such an arrangement.

In summary, the invention makes possible a process controller which yields no output bump due to setpoint transfer and automatic-to-manual transfer. The setpoint and manual control stations may be constituted by an operational amplifier operating in conjunction with an inexpensive hold capacitor. The output drift of these stations, due to leakage current of the capacitor and input current of the amplifier, can be suppressed effectively by a single drift compensation circuit coupled to both stations by manual selection or alternately on a time-sharing basis.

The drift compensation circuit according to the invention is simple in design and of low cost, for by adding a flip-flop and four gates to a single compensation circuit, there is achieved the functional equivalent of two independent compensation circuits.

I claim:
1. A process controller operable in an automatic or a manual control mode comprising:
   A. a manual control station having an integral hold circuit when the controller is in the manual control mode;
   B. a setpoint station having an integral hold circuit;
   C. an automatic control station coupled to said setpoint station to compare a process variable with a setpoint valve provided by the setpoint station to produce a control integral for performing control functions;
   D. a drift compensation circuit adapted to convert the output of an integral hold circuit to digital signals and to deliver to the input of said integral hold circuit a compensation signal related to the last digit in said digital signals and varying therewith, and
   E. switching means alternately or selectively to connect said drift compensation circuit to said manual control station and to said setpoint station.

* * * * *

UNITED STATES PATENT OFFICE
CERTIFICATE OF CORRECTION

Patent No. 3,772,602    Dated November 13, 1973

Inventor(s) Tamotsu Kobayashi

It is certified that error appears in the above-identified patent and that said Letters Patent are hereby corrected as shown below:

Column 1, line 17 "current" should have read -- circuit --

Column 2, line 42 "anclosed" should have read -- enclosed --

Column 4, line 54 "Gate 39" should have read -- Gate 38 --

Signed and sealed this 19th day of March 1974.

(SEAL)
Attest:

EDWARD M. FLETCHER, JR.
Attesting Officer

C. MARSHALL DANN
Commissioner of Patents